United States Patent
Kang et al.

(10) Patent No.: US 8,710,738 B2
(45) Date of Patent: Apr. 29, 2014

(54) DISPLAY APPARATUS HAVING A SEMI-PENETRATION LAYER AND A SEALING UNIT

(75) Inventors: Tae Wook Kang, Yongin (KR); Jung-Min Lee, Yongin (KR)

(73) Assignee: Samsung Display Co., Ltd., Giheung-Gu, Yongin, Gyeonggi-Do (KR)

( * ) Notice: Subject to any disclaimer, the term of this patent is extended or adjusted under 35 U.S.C. 154(b) by 239 days.

(21) Appl. No.: 13/030,666

(22) Filed: Feb. 18, 2011

(65) Prior Publication Data

US 2011/0215713 A1 Sep. 8, 2011

(30) Foreign Application Priority Data

Mar. 8, 2010 (KR) .................. 10-2010-0020403

(51) Int. Cl.
*H01L 51/50* (2006.01)

(52) U.S. Cl.
USPC ........................................... 313/512; 313/504

(58) Field of Classification Search
None
See application file for complete search history.

(56) References Cited

U.S. PATENT DOCUMENTS

| | | | |
|---|---|---|---|
| 2005/0001545 A1* | 1/2005 | Aitken et al. ................. | 313/512 |
| 2005/0022538 A1 | 2/2005 | Takagi | |
| 2005/0217320 A1* | 10/2005 | Eberhardt et al. ............... | 65/43 |
| 2007/0128967 A1 | 6/2007 | Becken et al. | |
| 2009/0086325 A1 | 4/2009 | Liu et al. | |
| 2009/0146550 A1* | 6/2009 | Uehara ......................... | 313/504 |
| 2010/0013745 A1* | 1/2010 | Kim et al. ..................... | 345/76 |
| 2010/0117525 A1 | 5/2010 | Warashina et al. | |

FOREIGN PATENT DOCUMENTS

| | | |
|---|---|---|
| KR | 10-0506113 | 7/2005 |
| KR | 10-2008-0001851 | 1/2008 |
| KR | 10-2008-0088032 | 10/2008 |
| KR | 1020090128430 A | 12/2009 |
| KR | 10-0942118 | 2/2010 |

OTHER PUBLICATIONS

Korean Office Action issued by KIPO, dated May 30, 2011, corresponding to Korean Patent Application No. 10-2010-0020403 together with Request for Entry.

* cited by examiner

*Primary Examiner* — Britt D Hanley
(74) *Attorney, Agent, or Firm* — Robert E. Bushnell, Esq.

(57) ABSTRACT

A display apparatus including: a substrate; a display unit disposed on the substrate; a sealing substrate facing the display unit; a sealing unit spaced apart from the display unit and disposed between the substrate and the sealing substrate and connecting the substrate to the sealing substrate; and a semi-penetration layer disposed on the substrate and not protruding from a width of the sealing unit, and absorbing a predetermined amount of light incident on the sealing substrate, thereby improving characteristics of the sealing unit.

18 Claims, 7 Drawing Sheets

DISPLAY APPARATUS HAVING A SEMI-PENETRATION LAYER AND A SEALING UNIT

CROSS-REFERENCE TO RELATED APPLICATION

This application claims the benefit of Korean Patent Application No. 10-2010-0020403, filed on Mar. 8, 2010, in the Korean Intellectual Property Office, the disclosure of which is incorporated herein by reference.

BACKGROUND

1. Field

An aspect of the present invention relates to display apparatus and more particularly, to a display apparatus that easily improves characteristics of a sealing unit.

2. Description of the Related Art

Recently, display apparatuses are being replaced by flat panel display apparatuses that are portable and thin. Specifically, flat panel display apparatuses, such as organic light emitting display apparatuses and liquid crystal display apparatuses, have come into the spotlight due to their excellent image quality.

A flat panel display apparatus includes a display unit between a substrate and a sealing substrate, and a sealing unit connecting the substrate and the sealing substrate. Various materials are used to form the sealing unit, and the sealing unit may be formed by pre-forming a material and hardening the material by irradiating light thereto. A profile of the irradiated light has a Gaussian type shape with a protruding center, and thus the center of the sealing unit is excessively heated, compared to the edges of the sealing unit, with respect to the width of the sealing unit.

Specifically, when the sealing unit includes a glass frit, the sealing unit connects the substrate and the sealing substrate together as the glass frit is melted by irradiating a laser beam thereto and cools down. Here, the center of the sealing unit is not uniformly heated due to a profile characteristic of the laser beam, and thus improving the characteristics of the sealing unit is limited.

SUMMARY

Aspects of the present invention provide display apparatuses that easily improve characteristics of a sealing unit.

According to an aspect of the present invention, there is provided a display apparatus including: a substrate; a display unit disposed on the substrate; a sealing substrate facing the display unit; a sealing unit spaced apart from the display unit between the substrate and the sealing substrate and connecting the substrate to the sealing substrate; and a semi-penetration layer disposed farther from the substrate than the sealing unit while not deviating from the width of the sealing unit, and absorbing a predetermined amount of light incident on the sealing substrate.

According to an aspect of the present invention, the semi-penetration layer may correspond to at least the center of the sealing unit, with respect to the width of the sealing unit.

According to another aspect of the present invention, the center of the width of the semi-penetration layer may correspond to the center of the width of the sealing unit.

According to another aspect of the present invention, the semi-penetration layer may include a conductive or insulating material.

The semi-penetration layer may include any one material selected from the group consisting of indium tin oxide (ITO), indium zinc oxide (IZO), indium oxide (IO), gallium-doped oxide (GZO), zinc oxide (ZnO), aluminum-doped oxide (AZO), fluorine-doped tin, oxide (FTO), antimony-doped tin oxide (ATO), $In_2O_3$, $SiO_2$, and SiNx.

According to another aspects of the present invention, the sealing unit may include a glass frit.

According to another aspects of the present invention, the sealing unit may be disposed on an outer circumference of the display unit.

The semi-penetration layer may be disposed on a surface of the sealing substrate facing the sealing unit.

The semi-penetration layer may include a conductive material, the display unit may include an organic light emitting device, and the display apparatus may further include a bus electrode layer disposed between the organic light emitting device and the sealing substrate to connect the organic light emitting device and the sealing substrate and may include the same material as the semi-penetration layer.

The organic light emitting device may include a first electrode, a second electrode, and an intermediate layer disposed between the first and second electrodes and including an organic light emitting layer, and the bus electrode layer may be formed to contact the second electrode.

According to another aspect of the present invention, the semi-penetration layer may be disposed on an opposite surface to a surface of the sealing substrate facing the substrate.

The display apparatus may further include an electrostatic capacity pattern layer on the opposite surface to the surface of the sealing substrate facing the substrate to detect a touch of a user.

According to another aspect of the present invention, the semi-penetration layer may be of the same material as the electrostatic capacity pattern layer.

The display apparatus may further include an insulating layer on at least one surface of the electrostatic capacity pattern layer, wherein the insulating layer may be of the same material as the semi-penetration layer.

A data line may be disposed on the sealing substrate to be connected to the electrostatic capacity pattern layer, the semi-penetration layer may be spaced apart from a predetermined area, and the data line may be disposed to pass through the predetermined area.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION

Figure 1:
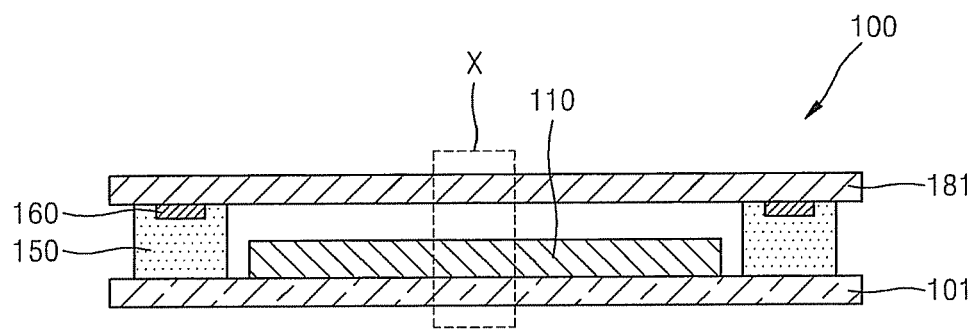
FIG. 1 is a cross-sectional view schematically illustrating a display apparatus according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures. Moreover, it is to be understood that where is stated herein that one film or layer is "formed on" or "disposed on" a second layer or film, the first layer or film may be formed or disposed directly on the second layer or film or there may be intervening layers or films between the first layer or film and the second layer or film. Further, as used herein, the term "formed on" is used with the same meaning as "located on" or "disposed on" and is not meant to be limiting regarding any particular fabrication process.

Figure 2:
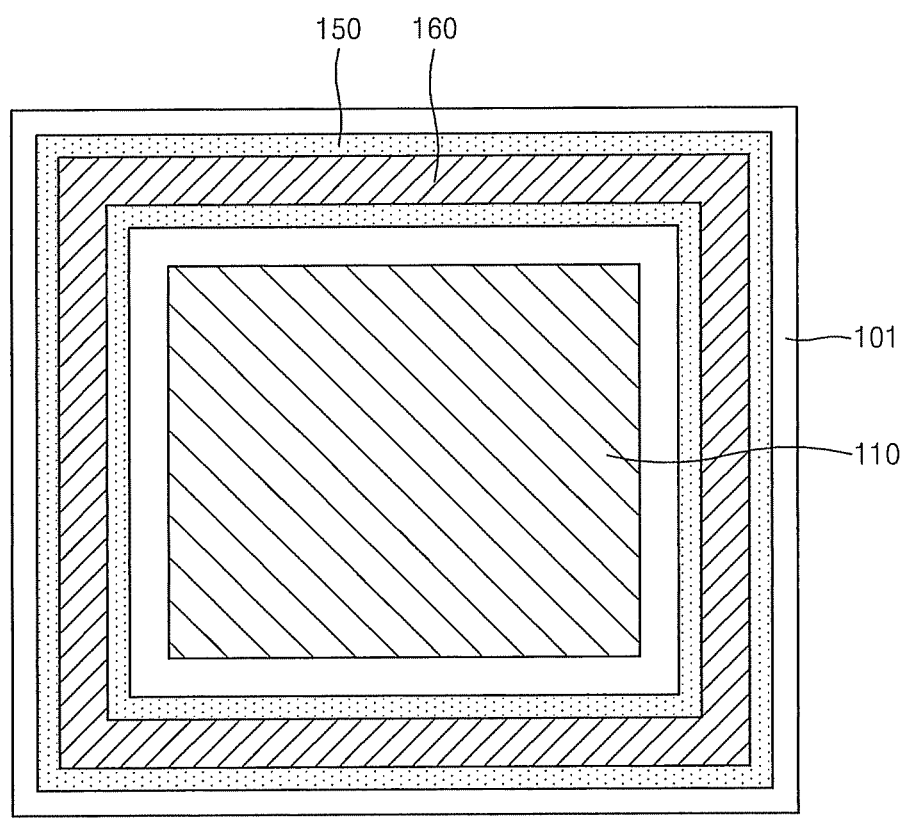
FIG. 2 is a plan view schematically illustrating the display apparatus of FIG. 1.
Figure 3:
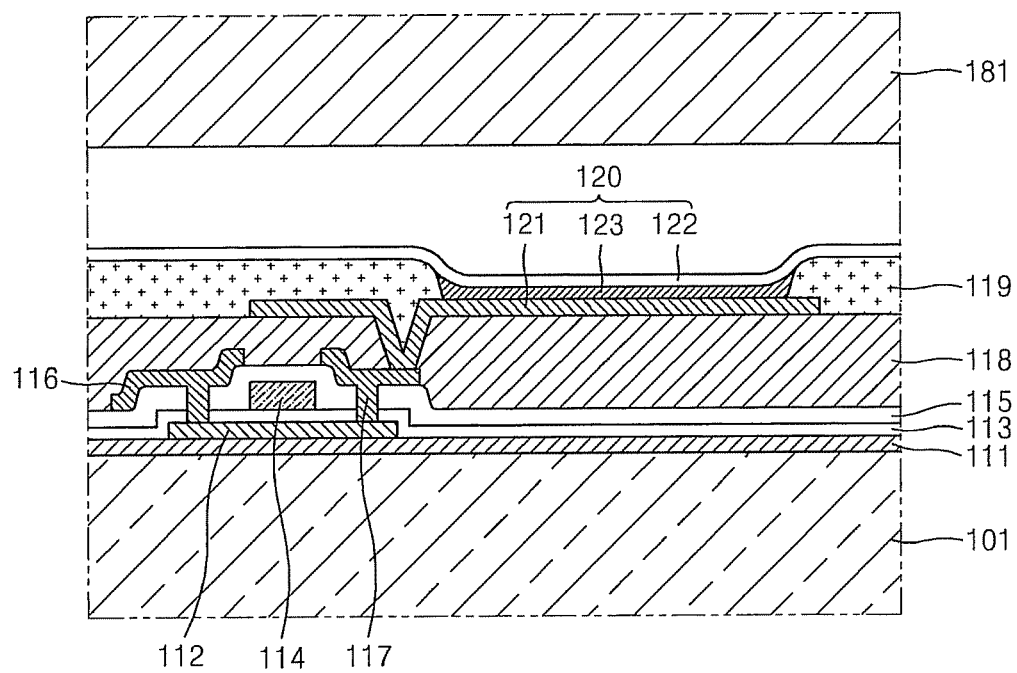
FIG. 3 is an enlarged diagram of an area X of FIG. 1.

FIG. 1 is a cross-sectional view schematically illustrating a display apparatus 100 according to an embodiment of the present invention, FIG. 2 is a plan view schematically illustrating the display apparatus 100 of FIG. 1, and FIG. 3 is an enlarged diagram of an area X of FIG. 1.

Referring to FIG. 1, the display apparatus 100 includes a substrate 101, a display unit 110, a sealing substrate 181, a sealing unit 150, and a semi-penetration layer 160.

The substrate 101 may be formed of a transparent glass material having $SiO_2$ as a main component. However, a material of the substrate 101 is not limited thereto, and may be a transparent plastic material. Here, the transparent plastic material forming the substrate 101 may be an insulating organic material selected from the group consisting of polyethersulphone (PES), polyacrylate (PAR), polyetherimide (PEI), polyethyelenen napthalate (PEN), polyethyelene-terepthalate (PET), polyphenylene sulfide (PPS), polyallylate, polyimide, polycarbonate (PC), cellulose triacetate (TAC), and cellulose acetate propionate (CAP).

The display unit 110 is disposed on the substrate 101. The display unit 110 may have various shapes. In an embodiment of the present invention, the display unit 110 includes an organic light emitting device (not shown), but alternatively, the display unit 110 may include a liquid crystal device.

The sealing substrate 181 is disposed facing the display unit 110. The sealing substrate 181 is formed of a transparent material and protects the display unit 110 from external moisture or oxygen.

The sealing unit 150 is disposed between the substrate 101 and the sealing substrate 181. The sealing unit 150 is formed at a predetermined distance from the display unit 110 and around an outer circumference of the display unit 110. The sealing unit 150 includes glass frit.

The semi-penetration layer 160 is disposed on a surface of the sealing substrate 181 facing the sealing unit 150. In other words, the semi-penetration layer 160 is formed to contact the sealing unit 150. Also, the semi-penetration layer 160 is formed to correspond to a center area of the sealing unit 150.

In detail, the semi-penetration layer 160 has a width smaller than a width of the sealing unit 150 so that the semi-penetration layer 160 does not protrude from the width of the sealing unit 150. Also, a center of the width of the semi-penetration layer 160 is adjusted to be identical to a center of the width of the sealing unit 150, so that the semi-penetration layer 160 is disposed in the center area of the sealing unit 150.

The sealing unit 150 containing the glass frit is plasticized after being coated as a glass frit paste, and then is hardened by irradiating a laser beam from the top of the sealing substrate 181. Here, a profile of the irradiated laser beam has a Gaussian type shape. In other words, energy intensity of the laser beam is the highest in the center and decreases away from the center.

Accordingly, when the laser beam is irradiated, higher energy is incident on the center than the edges of the sealing unit 150, with respect to the width of the sealing unit 150. Thus, the sealing unit 150 has a non-uniform energy distribution, and thus non-uniformly expands and non-uniformly contracts the sealing unit 150 during cooling after the laser beam is irradiated. Such non-uniform expansion and contraction generates non-uniform residual stress according to areas of the sealing unit 150, and as a result, characteristics of the sealing unit 150 sealing the substrate 101 and the sealing substrate 181 deteriorate.

Also, when the higher energy of the irradiated laser beam is incident on the center rather than on the edge of the sealing unit 150, with respect to the width of the sealing unit 150, a bottom portion of the sealing unit 150, i.e., the substrate 101 and various thin films (not shown) formed on the substrate 101, is damaged.

When the higher energy of the irradiated laser beam is incident on the center rather than on the edge of the sealing unit 150, with respect to the width of the sealing unit 150, the center area of the sealing unit 150 excessively expands or bubbles are generated in the center area thereof, and thus characteristics of the sealing unit 150 deteriorate.

However, according to an embodiment of the present invention, the semi-penetration layer 160 is disposed to reduce the intensity of energy irradiated on the center of the sealing unit 150. Accordingly, the semi-penetration layer 160 is formed to allow some part of light to penetrate and absorb the remaining part of the light, such as the laser beam.

The semi-penetration layer 160 may contain any one selected from the group consisting of indium tin oxide (ITO), indium zinc oxide (IZO), indium oxide (IO), gallium-doped oxide (GZO), zinc oxide (ZnO), aluminum-doped oxide (AZO), fluorine-doped tin oxide (FTO), antimony-doped tin oxide (ATO), $In_2O_3$, $SiO_2$, and SiNx.

Figure 4:
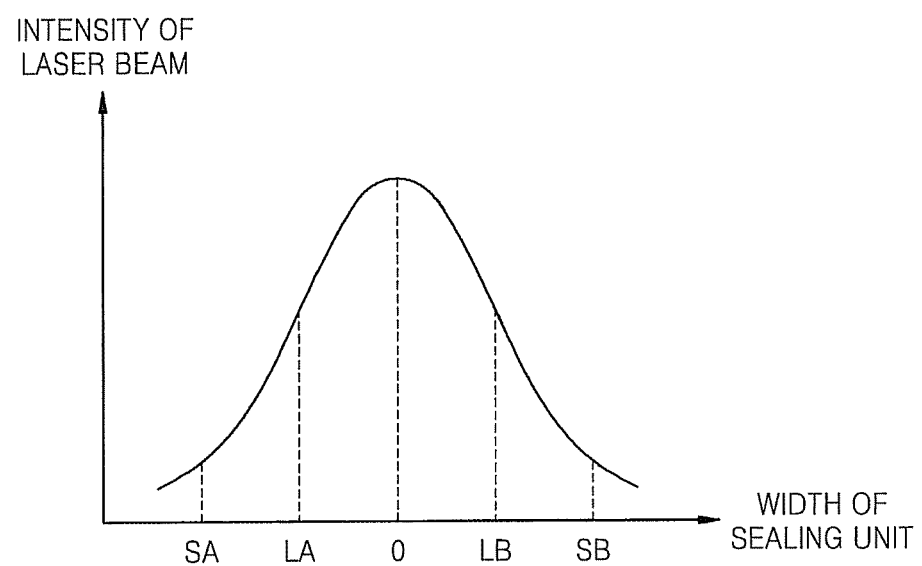
FIG. 4 is a graph showing a profile of a laser beam used during a sealing process of the display apparatus of FIG. 1.

FIG. 4 is a graph showing the profile of the laser beam used during a sealing process of the display apparatus 100 of FIG. 1.

Referring to FIG. 4, the profile of the laser beam has a Gaussian type shape, with respect to the width of the sealing unit 150. In FIG. 4, O denotes the center of the sealing unit 150, SA and SB denote the widths of the sealing unit 150, and LA and LB denote the widths of the semi-penetration layer 160. As shown in FIG. 4, the energy of the laser beam is concentrated on the center rather than on the edges of the sealing unit 150. Thus, the above-described problems may occur. However, in an embodiment of the present invention, the semi-penetration layer 160 absorbs some of the energy of the laser beam, thereby reducing the energy of the laser beam incident on the center of the sealing unit 150. Thus, the center area of the sealing unit 150 may be prevented from being excessively heated.

In FIGS. 1 and 2, the semi-penetration layer 160 is formed in one pattern, but is not limited thereto. In other words, the semi-penetration layer 160 may be patterned to have a plurality of layers that are spaced apart from each other. In other words, FIG. 2 shows the semi-penetration layer 160 patterned in a quadrangle, but the semi-penetration layer 160 may be patterned in a plurality of quadrangles spaced apart from each other in parallel and having the same center. Here, the plurality of layers are disposed in irregular intervals, and are more densely disposed toward the center of the sealing unit 150, with respect to the width of the sealing unit 150. Accordingly, the center area of the sealing unit 150 may be prevented from being excessively heated.

The display unit 110 may have various shapes, and the display unit 110 uses an organic light emitting device. The display unit 110 will now be described in detail with reference to FIG. 3.

A buffer layer 111 is disposed on the substrate 101. The buffer layer 111 provides a flat surface on the top of the substrate 101, and prevents moisture or an impurity from permeating into the substrate 101.

An active layer 112 having a predetermined pattern is disposed on the buffer layer 111. The active layer 112 may be formed of an inorganic semiconductor, such as amorphous silicon or polysilicon, or an organic semiconductor, and includes a source region, a drain region, and a channel region.

The source and drain regions may be formed by doping the active layer 112, which is formed of amorphous silicon or polysilicon, with impurities. A p-type semiconductor may be formed by doping a Group III element, such as boron (B), and an n-type semiconductor may be formed by doping a Group V element, such as nitrogen (N).

A gate insulating layer 113 is disposed on the active layer 112, and a gate electrode 114 is disposed in a predetermined area on the gate insulating layer 113. The gate insulating layer 113 is used to insulate the active layer 112 and the gate electrode 114 from each other, and may be formed of an organic material or an inorganic material, such as SiNx or $SiO_2$.

Examples of a material for forming the gate electrode 114 include metals, such as gold (Au), silver (Ag), copper (Cu), nickel (Ni), platinum (Pt), palladium (Pd), aluminum (Al), and molybdenum (Mo), and alloys of metals, such as Al:Nd and Mo:W, but are not limited thereto. Any material may be used considering adhesiveness, flatness, electrical resistance, and processability. The gate electrode 114 is connected to a gate line (not shown) for applying an electric signal.

An interlayer insulating layer 115 is disposed on the gate electrode 114. The interlayer insulating layer 115 and the gate insulating layer 113 are formed so as to expose the source and drain regions of the active layer 112, and a source electrode 116 and a drain electrode 117 respectively contact the exposed source and drain regions of the active layer 112.

Examples of a material for forming the source and drain electrodes 116 and 117 include metals, such as Au, Pd, Pt, Ni, rhodium (Rh), ruthenium (Ru), iridium (Ir), osmium (Os), Al, and Mo, and alloys of at least two types of metals, such as Al:Nd and MoW, but are not limited thereto.

A passivation layer 118 is disposed to cover the source and drain electrodes 116 and 117. The passivation layer 118 may be an inorganic insulating layer and/or an organic insulating layer. The inorganic insulating layer may include $SiO_2$, SiNx, SiON, $Al_2O_3$, $TiO_2$, $Ta_2O_5$, $HfO_2$, $ZrO_2$, BST, or PZT, and the organic insulating layer may include a generally widely used polymer, such as poly(methyl methacrylate) (PMMA) or PS, a polymer derivative having a phenol group, an acryl-based polymer, an imide-based polymer, an arylether-based polymer, an amide-based polymer, a fluorine-based polymer, a p-xylene-based polymer, a vinyl alcohol-based polymer, or a blend thereof. The passivation layer 118 may have a complex stacked structure of the inorganic insulating layer and the organic insulating layer.

The passivation layer 118 is formed so as to expose the drain electrode 117, and an organic light emitting device 120 is formed to be connected to the exposed drain electrode 117. The organic light emitting device 120 includes a first electrode 121, a second electrode 122, and an intermediate layer 123. In detail, the first electrode 121 and the drain electrode 117 contact each other.

The intermediate layer 123 includes an organic light emitting layer, and emits visible rays when a voltage is applied thereto through the first and second electrodes 121 and 122.

A pixel defining layer 119 formed of an insulating material is disposed on the first electrode 121. A predetermined opening is formed in the pixel defining layer 119 so that the first electrode 121 is exposed. The intermediate layer 123 is disposed on the exposed first electrode 121. Also, the second electrode 122 is formed to be connected to the intermediate layer 123.

The first electrode 121 and the second electrode 122 respectively have polarities of an anode and a cathode, but this aspect of the invention is not limited thereto, and the polarities of the first and second electrodes 121 and 122 may be switched.

The sealing substrate 181 is disposed on the second electrode 122.

The semi-penetration layer 160 is formed on a bottom surface of the sealing substrate 181, which is the surface of the sealing substrate 181 facing the sealing unit 150 such that the semi-penetration layer 160 does not protrude from the sealing unit 150. Accordingly, when the laser beam is irradiated during the sealing process involving the sealing unit 150, the center area with respect to the width of the sealing unit 150 may be prevented from being overheated. As a result, the non-uniform expansion and contraction of the sealing unit 150 is prevented, thereby preventing the generation of residual stress in the sealing unit 150 and improving durability of the sealing unit 150. Thus, sealing characteristics of the sealing unit 150 are improved.

Also, excessive energy is prevented from reaching the bottom of the sealing unit 150, and thus the substrate 101 and thin films on the substrate 101 are prevented from being damaged by the laser beam.

Figure 5:
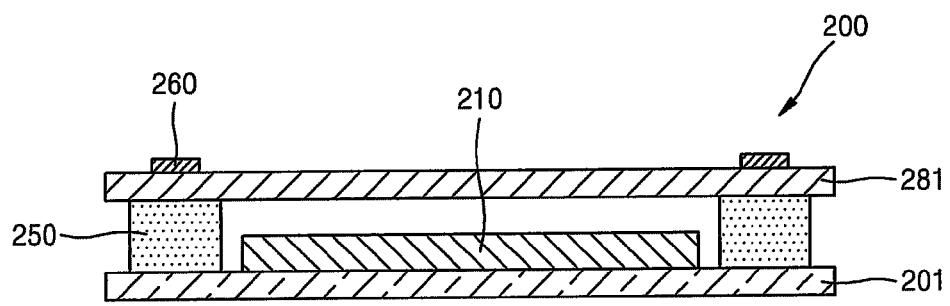
FIG. 5 is a cross-sectional view schematically illustrating a display apparatus according to another embodiment of the present invention.
Figure 6:
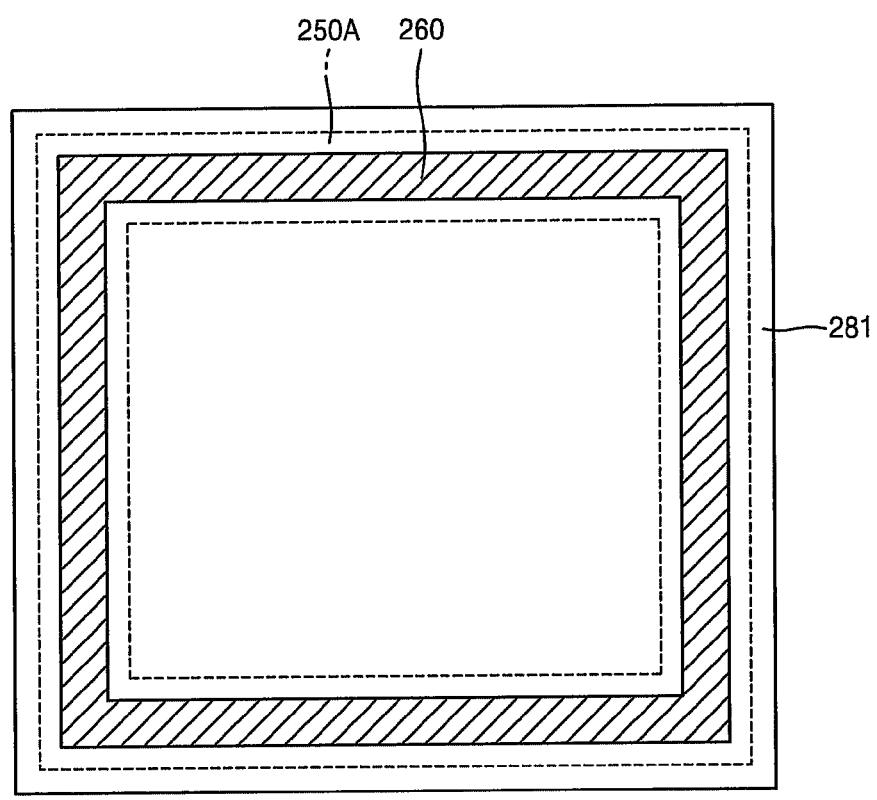
FIG. 6 is a plan view schematically illustrating the display apparatus of FIG. 5.

FIG. 5 is a cross-sectional view schematically illustrating a display apparatus 200 according to another embodiment of the present invention, and FIG. 6 is a plan view schematically illustrating the display apparatus of 200 FIG. 5. FIG. 6 is a view from a top surface of a sealing substrate 281 of FIG. 5, wherein a dashed line 250A shows a location of a sealing unit 250.

For convenience of description, differences between the display apparatus 100 and the display apparatus 200 will be mainly described.

Referring to FIG. 5, the display apparatus 200 includes a substrate 201, a display unit 210, the sealing substrate 281, the sealing unit 250, and a semi-penetration layer 260.

The display unit 210 is disposed on the substrate 201. The sealing substrate 281 is disposed facing the display unit 210. The sealing unit 250 is disposed between the substrate 201 and the sealing substrate 281. The sealing unit 250 is disposed at a predetermined distance from an outer circumference of the display unit 210. The sealing unit 250 includes glass frit.

The semi-penetration layer 260 is disposed on a top surface of the sealing substrate 281, i.e., on an opposite surface of a surface facing the sealing unit 250. In other words, the semi-penetration layer 260 and the sealing unit 250 are formed on different surfaces. Also, the semi-penetration layer 260 is formed to correspond to a center area of the sealing unit 250.

In detail, the semi-penetration layer 260 has a width smaller than a width of the sealing unit 250 so as not to protrude from the width of the sealing unit 250. Also, a center of the width of the semi-penetration layer 260 corresponds to a center of the width of the sealing unit 250 that the semi-penetration layer 260 is disposed in the center area of the sealing unit 250.

The semi-penetration layer 260 is formed to allow a part of light to penetrate and absorb the remaining light, such as laser beam, to reduce energy incident on the center of the sealing unit 250.

Details about materials for forming each element have been described above, and thus will not be repeated.

In the display apparatus 200, the semi-penetration layer 260 is disposed on the top surface of the sealing substrate 281 such that the semi-penetration layer 260 does not protrude from the sealing unit 250. Accordingly, when the laser beam is irradiated during a sealing process involving the sealing unit 250, the center of the sealing unit 250 may be prevented from being overheated. Accordingly, non-uniform expansion and contraction of the sealing unit 250 are prevented, thereby preventing generation of residual stress in the sealing unit 250 and improving durability of the sealing unit 250. Thus, sealing characteristics of the sealing unit 250 are improved.

Also, excessive energy is prevented from reaching the bottom of the sealing unit 250, and thus the substrate 201 and thin films on the substrate 201 are prevented from being damaged by the laser beam.

Figure 7:
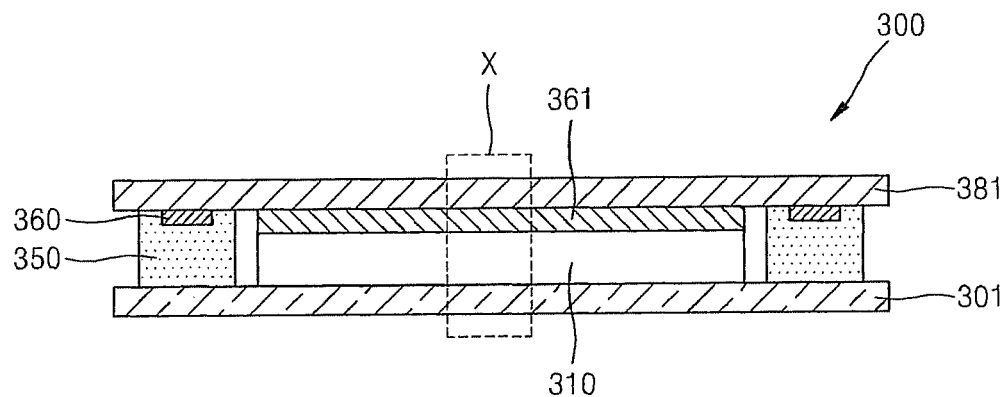
FIG. 7 is a cross-sectional view schematically illustrating a display apparatus according to another embodiment of the present invention.
Figure 8:
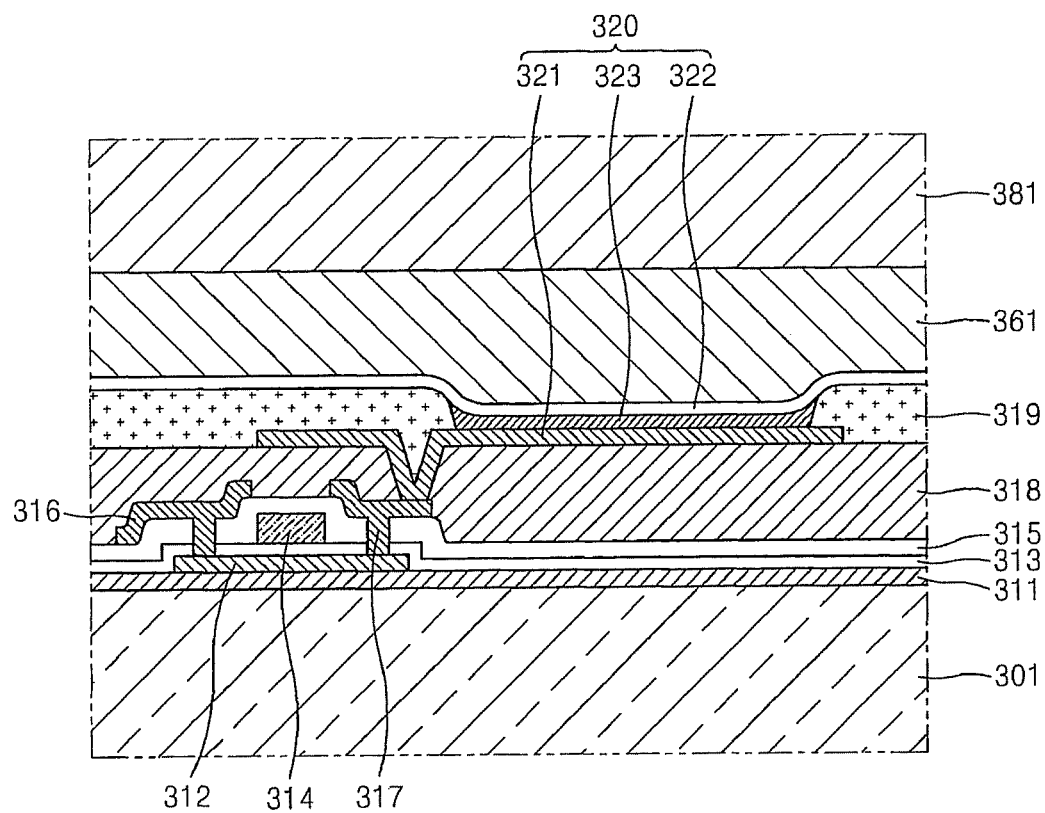
FIG. 8 is an enlarged diagram of an area X of FIG. 7.

FIG. 7 is a cross-sectional view schematically illustrating a display apparatus 300 according to another embodiment of the present invention, and FIG. 8 is an enlarged diagram of portion X of FIG. 7. For convenience of description, differences between the display apparatus 300 and the display apparatuses 100 and 200 will be mainly described.

Referring to FIG. 7, the display apparatus 300 includes a substrate 301, a display unit 310, a sealing substrate 381, a sealing unit 350, a semi-penetration layer 360, and a bus electrode layer 361. Also, the display unit 310 includes an organic light emitting device 320 including a first electrode 321, a second electrode 322, and an intermediate layer 323.

The display unit 310 is disposed on the substrate 301. The sealing substrate 381 is disposed facing the display unit 310. The sealing unit 350 is disposed between the substrate 301 and the sealing substrate 381. The sealing unit 350 is formed at a predetermined distance from an outer circumference of the display unit 310. The sealing unit 350 includes glass frit.

The semi-penetration layer 360 is disposed on a bottom surface of the sealing substrate 381, which is a surface of the sealing substrate 381 facing the sealing unit 350. In other words, the semi-penetration layer 360 is formed to contact the sealing unit 350. Also, the semi-penetration layer 360 is formed to correspond to a center area of the sealing unit 350.

In detail, the semi-penetration layer 360 has a smaller width than the sealing unit 350 so as not to protrude from the sealing unit 350. Also, the center of the width of the semi-penetration layer 360 corresponds to the center of the width of the sealing unit 350 so that the semi-penetration layer 360 is disposed in the center area of the sealing unit 350.

The semi-penetration layer 360 is formed to allow a part of light to penetrate and absorb the remaining part of the light, such as laser beam, thereby reducing energy incident on the center of the sealing unit 350. The semi-penetration layer 360 includes a conductive material. In detail, the semi-penetration layer 360 may include any one selected from the group consisting of ITO, IZO, IO, GZO, ZnO, AZO, FTO, ATO, and $In_2O_3$, which allow a part of light to penetrate.

Here, the bus electrode layer 361 is formed on the sealing substrate 381, by using the same material as the semi-penetration layer 360. The bus electrode layer 361 is formed to maintain a suitable thickness to contact the second electrode 322 of the organic light emitting device 320 included in the display unit 310, in a following process.

Referring to FIG. 8, a buffer layer 311 is disposed on the substrate 301. An active layer 312 having a predetermined pattern is disposed on the buffer layer 311. A gate insulating layer 313 is disposed on the active layer 312, and a gate electrode 314 is disposed on a predetermined area on the gate insulating layer 313.

An interlayer insulating layer 315 is disposed on the gate electrode 314. The interlayer insulating layer 315 and the gate insulating layer 313 are formed so as to expose a source region and a drain region of the active layer 312, and a source electrode 316 and a drain electrode 317 are formed to respectively contact the exposed source region and drain region of the active layer 312.

A passivation layer 318 is disposed to cover the source and drain electrodes 316 and 317. The passivation layer 318 is formed so as to expose the drain electrode 317, and the organic light emitting device 320 is formed to be connected to the exposed drain electrode 317. The organic light emitting device 320 includes the first electrode 321, the second electrode 322, and the intermediate layer 323. In detail, the first electrode 321 and the drain electrode 317 contact each other.

The intermediate layer 323 includes an organic light emitting layer, and produces visible rays when a voltage is applied through the first and second electrodes 321 and 322.

A pixel defining layer 319 is formed on the first electrode 321, by using an insulating material. A predetermined opening is formed in the pixel defining layer 319 to expose the first electrode 321. The intermediate layer 323 is disposed on the exposed first electrode 321. Also, the second electrode 322 is formed to be connected to the intermediate layer 323.

The bus electrode layer 361 is disposed on the second electrode 322. The bus electrode 361 includes a conductive material. The bus electrode layer 361 contacts the second electrode 322 to prevent a voltage drop (IR-drop) phenomenon.

The sealing substrate 381 is disposed on the bus electrode layer 361.

In the display apparatus 300, the semi-penetration layer 360 is formed on a bottom surface of the sealing substrate 381, which is a surface of the sealing substrate 381 facing the sealing unit 350 such that the semi-penetration layer 360 does not protrude from the sealing unit 350. Accordingly, a center of the width of the sealing unit 350 is prevented from being overheated when the laser beam is irradiated during a sealing process involving the sealing unit 350. As a result, the non-uniform expansion and contraction of the sealing unit 350 is prevented, thereby preventing the generation of residual stress in the sealing unit 350 and improving durability of the sealing unit 350. Thus, sealing characteristics of the sealing unit 350 are improved.

Also, excessive energy is prevented from reaching the bottom of the sealing unit 350, and thus the substrate 301 and thin films on the substrate 301 are prevented from being damaged by the laser beam.

Also, the IR drop phenomenon due to the increasing size of the display apparatus 300 may be prevented. Additionally, the bus electrode layer 361 is formed of the same conductive material as the semi-penetration layer 360. Specifically, the bus electrode layer 361 may be formed while forming the semi-penetration layer 360 on the sealing substrate 381, and thus the manufacturing processing speed is increased since a separate mask or process is not required.

Figure 9:
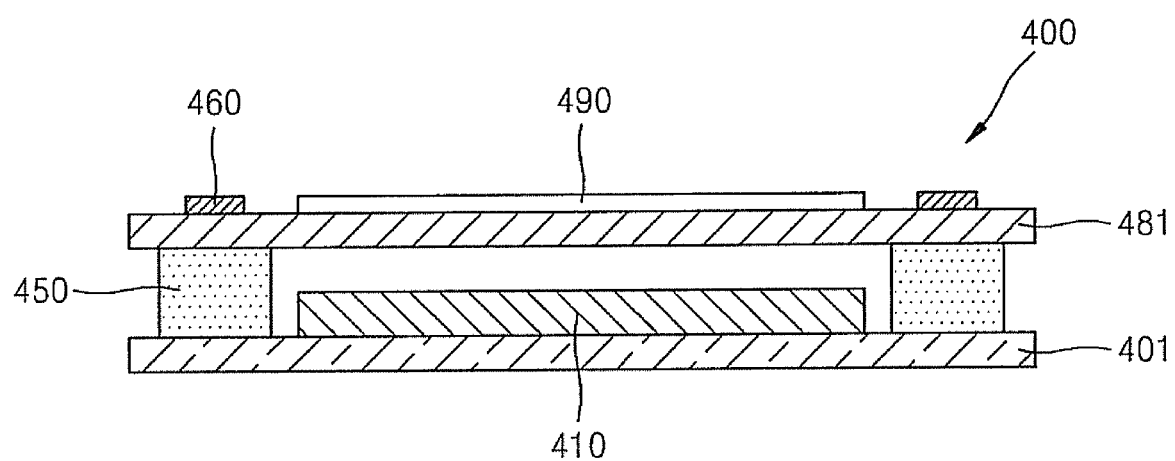
FIG. 9 is a cross-sectional view schematically illustrating a display apparatus according to another embodiment of the present invention.
Figure 10:
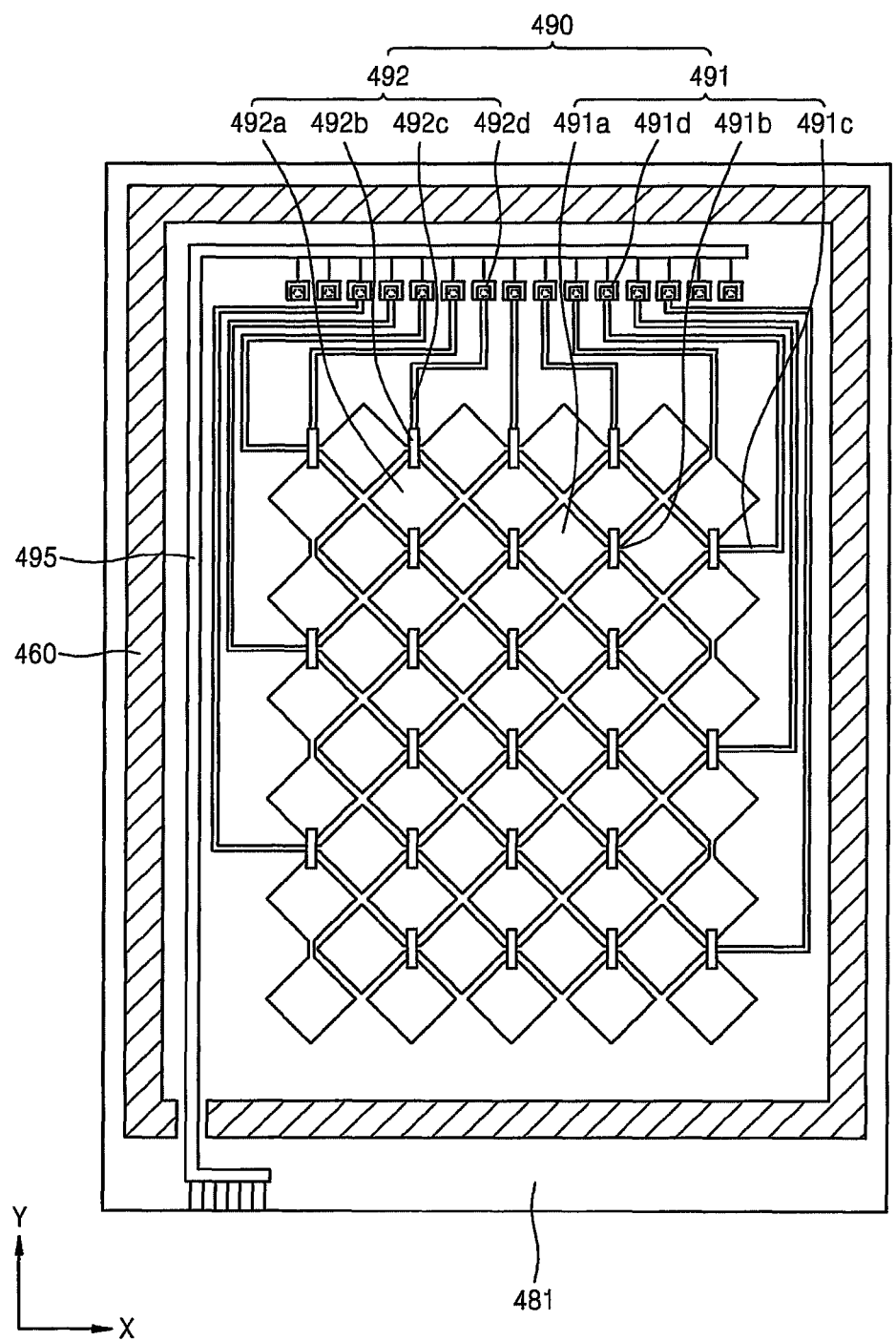
FIG. 10 is a plan view schematically illustrating the display apparatus of FIG. 9.
Figure 11:
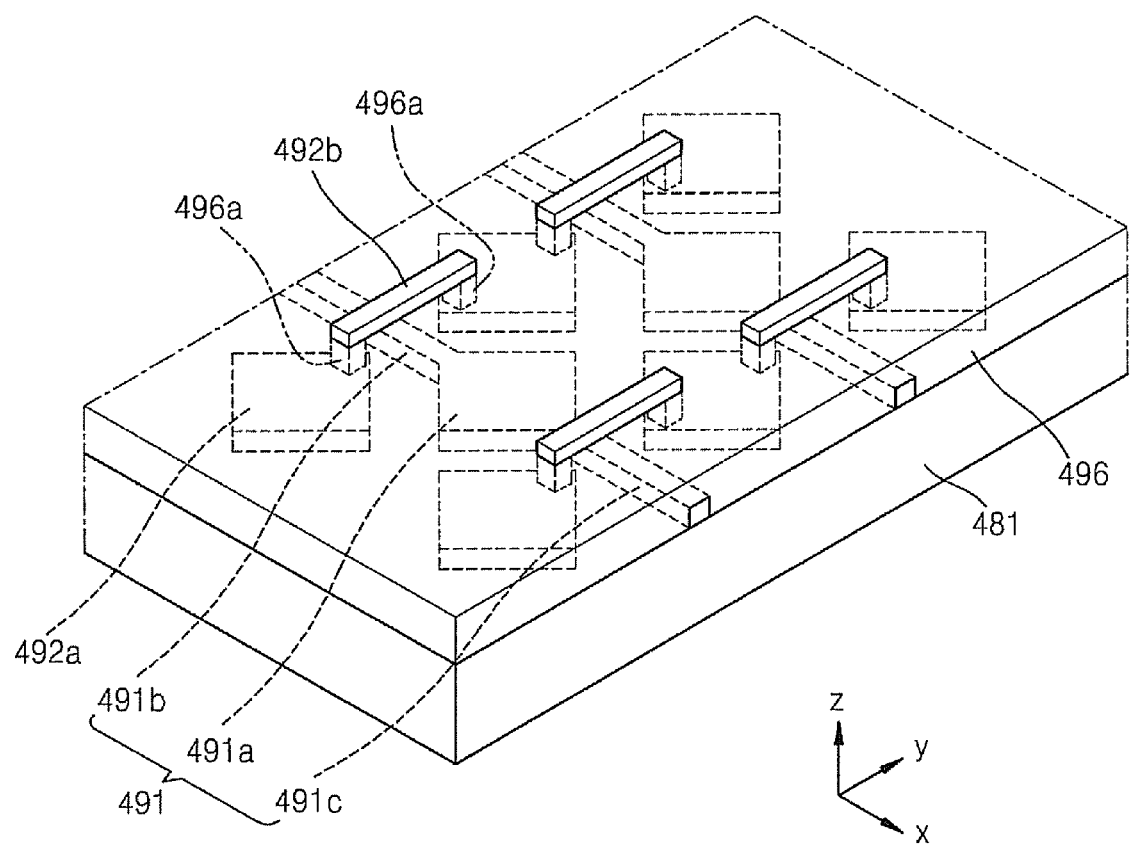
FIG. 11 is a perspective view illustrating in detail an electrostatic capacity pattern layer of FIG. 9.

FIG. 9 is a cross-sectional view schematically illustrating a display apparatus 400 according to another embodiment of the present invention, FIG. 10 is a plan view schematically illustrating the display apparatus 400 of FIG. 9, and FIG. 11 is a partial perspective view illustrating in detail an electrostatic capacity pattern layer 490 of FIG. 9. For convenience of description, differences between the display apparatus 400 and the display apparatuses 100 through 300 will be mainly described.

Referring to FIG. 9, the display apparatus 400 includes a substrate 401, a display unit 410, a sealing substrate 481, a sealing unit 450, a semi-penetration layer 460, and the electrostatic capacity pattern layer 490.

The display unit 410 is disposed on the substrate 401. The sealing substrate 481 is disposed facing the display unit 410. The sealing unit 450 is disposed between the substrate 401 and the sealing substrate 481. The sealing unit 450 is disposed a predetermined distance from an outer circumference of the display unit 410. The sealing unit 450 includes glass frit.

The semi-penetration layer 460 is disposed on a top surface of the sealing substrate 481, i.e., on an opposite surface of a surface facing the sealing unit 450. In other words, the semi-penetration layer 460 and the sealing unit 450 are formed on different surfaces. Also, the semi-penetration layer 460 is formed to correspond to a center area of the sealing unit 450.

In detail, the semi-penetration layer 460 has a smaller width than the sealing unit 450 so that the semi-penetration layer 460 does not protrude from the sealing unit 450. Also, a center of the width of the semi-penetration layer 460 corresponds to a center of the width of the sealing unit 450 so that the semi-penetration layer 460 is disposed on the center area of the sealing unit 450.

The semi-penetration layer 460 is formed to allow a part of light to penetrate, and to absorb the remaining part of light, such as laser beam, to reduce energy incident on the center of the sealing unit 450.

The electrostatic capacity pattern layer 490 is formed on one surface of the sealing substrate 481, i.e., on an opposite surface of a surface facing the display unit 410. The electrostatic capacity pattern layer 490 detects a touch of a user, as will be described in detail with reference to FIGS. 10 and 11.

The electrostatic capacity pattern layer 490 formed on the sealing substrate 481 includes a first pattern layer 491 and a second pattern layer 492. The first pattern layer 491 includes a plurality of first pad units 491a, which are formed in parallel to each other along a first direction, i.e., an X direction of FIG. 10, a plurality of first connectors 491b, a first extender 491c, and a first access unit 491d.

The second pattern layer 492 includes a plurality of second pad units 492a, which are formed in parallel to each other along a second direction substantially perpendicular to the first direction, i.e., a Y direction of FIG. 10, a plurality of second connectors 492b, a second extender 492c, and a second access unit 492d.

The first pattern layer 491 and the second pattern layer 492 are alternately disposed. In other words, a plurality of the first pattern layers 491 are disposed in parallel to each other with adjacent corners facing each other along the first direction on the sealing substrate 481, and a plurality of the second pattern layers 492 are disposed between the plurality of first pattern layers 491 in parallel to each other with adjacent corners facing each other along the second direction.

In detail, the plurality of first pad units 491a are disposed respectively in parallel lines along the first direction. In FIG. 10, the first pad unit 491 has a lozenge shape, but is not limited thereto and may have various shapes. The first connector 491b is disposed between adjacent first pad units 491a, thereby connecting the adjacent first pad units 491a. The first extender 491c extends from one end of the first pad units 491a. The first extender 491c extends in one direction, for example, in the Y-direction of FIG. 10, and the first extenders 491c may gather at one end of the sealing substrate 481, i.e., at the top in FIG. 10. The first access unit 491d is formed at one end of the first extender 491c.

The plurality of second pad units 492a are formed in parallel lines, respectively, along the second direction, for example, the Y-direction of FIG. 10. In FIG. 10, the second pad unit 492a has a lozenge shape, but is not limited thereto and may have various shapes. The second pad units 492a are connected by the second connectors 492b. The second extender 492a extends from one end of the second pad unit 492a. The second extenders 492c may extend in one direction, for example, the Y-direction of FIG. 10, and gather at one end of the sealing substrate 481, i.e., the top of FIG. 10. The second access unit 492d is formed at the end of the second extender 492c.

FIG. 11 is a partial perspective view illustrating in detail the electrostatic capacity pattern layer 490 of FIG. 9. For convenience of description, a part of FIG. 10 is schematically illustrated.

Referring to FIG. 11, an insulating layer 496 is disposed to cover the first pattern layer 491 and the second pad units 492a. A contact hole 496a is formed in the insulating layer 496. The contact hole 496a is formed on a predetermined location of the insulating layer 496, for example, on an area of the insulating layer 496 corresponding to a corner portion where the second pad units 492a face each other.

The second connector 492b is formed to fill the contact hole 496a of the insulating layer 496. The second pad units 492a of the second pattern layer 492 are respectively connected to the second connectors 492b through the contact holes 496a, and adjacent second pad units 492a of the second pad units 492a are electrically connected to each other by the second connector 492b. The insulating layer 496 may be formed of any material that insulates the first pattern layer 491 and the second pattern layer 492. For example, the insulating layer 496 may include a silicon oxide, such as $SiO_2$ or $SiNx$.

Although not illustrated in FIG. 11, an additional insulating layer may be formed to cover the second connector 492b. The additional insulating layer may contain the same materials as the insulating layer 496.

According to such a configuration of the first and second pattern layers 491 and 492, the first pad units 491a and the second pad units 492a, which cross each other, may be formed not to overlap each other, and thus a short between the first and second pad units 491a and 492a may be prevented.

The first and second pattern layers 491 and 492 may include conductive patterns, and may be formed of a transparent material, such as ITO, IZO, IO, GZO, ZnO, AZO, FTO, ATO, or $In_2O_3$.

The first and second access units 491*d* and 492*d* may be formed of a metal having a low resistance value.

The sealing substrate 481 includes a data line 495 formed around the electrostatic capacity pattern layer 490. The data line 495 transmits an electric signal generated in the electrostatic capacity pattern layer 490 to a flexible printed circuit board (not shown). Also, a touch panel drive integrated circuit (TDI) (not shown) forming a touch panel function by receiving the electric signal generated in the electrostatic capacity pattern layer 490 is disposed in the flexible printed circuit board.

The semi-penetration layer 460 is formed at a predetermined distance from an outer circumference of the electrostatic capacity pattern layer 490 and is formed separate from the data line 495. Accordingly, the semi-penetration layer 460 may be formed so that the data line 495 extends along a bottom of the sealing substrate 481, i.e., to the Y-direction of FIG. 10.

The semi-penetration layer 460 may be formed of the same material as the electrostatic capacity pattern layer 490. In other words, the semi-penetration layer 460 may be formed while forming the first and second pattern layers 491 and 492. Here, the semi-penetration layer 460 includes a conductive material, such as ITO, IZO, IO, GZO, ZnO, AZO, FTO, ATO, or $In_2O_3$.

Alternatively, the semi-penetration layer 460 may be formed of the same material as the insulating layer 496. In other words, the semi-penetration layer 460 may be formed while forming the insulating layer 496. Here, the semi-penetration layer 460 includes $SiO_2$ or SiNx.

The display apparatus 400 analyzes and detects a change of electrostatic capacity generated by an approach or contact of an object, such as a finger of the hand of a person. Also, the display apparatus 400 outputs a coordinate and pressure at a location where the object approached or contacted.

In detail, a voltage flows through an uppermost electrode (not shown) installed in the display unit 410 before a user touches the display unit 410. Accordingly, the electrostatic capacity pattern layer 490 and electrodes included in the display unit 410 form one capacitor, and electrostatic capacity between the electrostatic capacity pattern layer 490 and the electrodes of the display unit 410 is uniformly maintained. Here, when the user touches the top of the sealing substrate 481, a finger of the user and the electrostatic capacity pattern layer 490 form another capacitor. These two capacitors are connected in series, and the entire electrostatic capacity changes due to the touch of the user. The display apparatus 400 may realize the touch panel function by detecting the location and the size of the change of the electrostatic capacity.

In the display apparatus 400, the semi-penetration layer 460 is formed on a top surface of the sealing substrate 481, i.e., on an opposite surface of a surface facing the sealing unit 450 so that the semi-penetration layer 460 does not deviate from the width of the sealing unit 450. Accordingly, the center of the width of the sealing unit 450 may be prevented from being overheated when the laser beam is irradiated during a sealing process involving the sealing unit 450. As a result, the non-uniform expansion and contraction of the sealing unit 450 is prevented, thereby preventing the generation of residual stress in the sealing unit 450 and improving durability of the sealing unit 450. Thus, sealing characteristics of the sealing unit 450 are improved.

Also, excessive energy is prevented from reaching the bottom of the sealing unit 450, and thus the substrate 401 and thin films on the substrate 401 are prevented from being damaged by the laser beam.

Also, the semi-penetration layer 460 is formed on the sealing substrate 481 while forming the electrostatic capacity pattern 490 and the insulating layer 496 so that the display apparatus 400 creates the touch panel function, and thus manufacturing process is increased.

Therefore, a display apparatus according to the aspects of the present invention easily improve characteristics of a sealing unit.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A display apparatus comprising:
a substrate;
a display unit disposed on the substrate;
a sealing substrate facing the display unit;
a sealing unit spaced apart from the display unit and disposed between the substrate and the sealing substrate and connecting the substrate to the sealing substrate; and
a semi-penetration layer disposed on a top surface of the sealing substrate and not protruding from a width of the sealing unit, and absorbing a predetermined amount of light incident on the sealing substrate,
wherein the sealing substrate faces away from the substrate.

2. The display apparatus of claim 1, wherein the semi-penetration layer is disposed on at least a center of the sealing unit, with respect to the width of the sealing unit.

3. The display apparatus of claim 1, wherein a center of a width of the semi-penetration layer corresponds to a center of the width of the sealing unit.

4. The display apparatus of claim 1, wherein the semi-penetration layer comprises a conductive material or an insulating material.

5. The display apparatus of claim 1, wherein the semi-penetration layer comprises any one material selected from the group consisting of indium tin oxide (ITO), indium zinc oxide (IZO), indium oxide (IO), gallium-doped oxide (GZO), zinc oxide (ZnO), aluminum-doped oxide (AZO), fluorine-doped tin oxide (FTO), antimony-doped tin oxide (ATO), $In_2O_3$, $SiO_2$, and SiNx.

6. The display apparatus of claim 1, wherein the sealing unit comprises a glass frit.

7. The display apparatus of claim 1, wherein the sealing unit is disposed along an outer circumference of the display unit at a predetermined distance.

8. The display apparatus of claim 1, wherein the semi-penetration layer comprises a conductive material, the display unit comprises an organic light emitting device, and the display apparatus further comprises a bus electrode layer disposed between the organic light emitting device and the sealing substrate to connect the organic light emitting device and the sealing substrate and is made of a same material as the semi-penetration layer.

9. The display apparatus of claim 8, wherein the organic light emitting device comprises a first electrode, a second electrode, and an intermediate layer disposed between the first and second electrodes and comprising an organic light emitting layer, and the bus electrode layer is formed to contact the second electrode.

10. The display apparatus of claim 1, wherein the semi-penetration layer is disposed on a top surface of the sealing substrate.

11. The display apparatus of claim 10, further comprising an electrostatic capacity pattern layer disposed on the top surface of the sealing substrate to detect a touch of a user.

12. The display apparatus of claim 11, wherein the semi-penetration layer is made of a same material as the electrostatic capacity pattern layer.

13. The display apparatus of claim 11, further comprising an insulating layer on at least one surface of the electrostatic capacity pattern layer, wherein the insulating layer is made of a same material as the semi-penetration layer.

14. The display apparatus of claim 11, wherein a data line is disposed on the sealing substrate to be connected to the electrostatic capacity pattern layer, the semi-penetration layer is spaced apart from a predetermined area, and the data line is disposed to pass through the predetermined area.

15. The display apparatus of claim 1, wherein the semi-penetration layer is patterned to comprise a plurality of layers disposed in parallel to each other without overlapping.

16. The display apparatus of claim 15, wherein the plurality of layers are more densely disposed from the edges of the sealing unit to the center of the sealing unit, with respect to the width of the sealing unit.

17. A display apparatus comprising:

a substrate;

a display unit disposed on the substrate;

a sealing substrate facing the display unit;

a sealing unit disposed between the substrate and the sealing substrate and connecting the substrate to the sealing substrate; and a semi-penetration layer disposed on a top surface of the sealing substrate in a center portion of the sealing unit, the semi-penetration unit having a width smaller than a width of the sealing unit, and absorbing a predetermined amount of light incident on the sealing substrate, wherein the sealing substrate faces away from the substrate.

18. The display apparatus of claim 17, further comprising an electrostatic capacity pattern layer, disposed on a surface of the sealing substrate facing the substrate, to detect a user's touch.

* * * * *